United States Patent
Baudasse et al.

(10) Patent No.: US 9,764,857 B2
(45) Date of Patent: Sep. 19, 2017

(54) DEPLOYABLE MAST WITH SPONTANEOUS AUTONOMOUS DEPLOYMENT, AND SATELLITE

(71) Applicant: THALES, Courbevoie (FR)

(72) Inventors: Yannick Baudasse, Cannes la Bocca (FR); Stéphane Vezain, Mandelieu (FR); Robin Lacroix, Cannes la Bocca (FR); François Guinot, Cannes la Bocca (FR)

(73) Assignee: THALES, Courbevoie (FR)

( * ) Notice: Subject to any disclaimer, the term of this patent is extended or adjusted under 35 U.S.C. 154(b) by 32 days.

(21) Appl. No.: 14/846,242

(22) Filed: Sep. 4, 2015

(65) Prior Publication Data

US 2016/0068281 A1     Mar. 10, 2016

(30) Foreign Application Priority Data

Sep. 5, 2014   (FR) ...................... 14 01992

(51) Int. Cl.
*B64G 1/22*     (2006.01)
*H01Q 1/12*     (2006.01)

(52) U.S. Cl.
CPC ........... *B64G 1/222* (2013.01); *H01Q 1/1235* (2013.01)

(58) Field of Classification Search
CPC . B64G 1/22; B64G 1/44; B64G 1/443; B64G 1/503; B64G 9/00; H01Q 1/1235; E04H 12/18; E04H 12/185; E04H 12/187; E04B 1/19; E04B 1/32; E04G 1/18; E04G 1/20; E04G 1/22

See application file for complete search history.

(56) References Cited

U.S. PATENT DOCUMENTS

| | | | | |
|---|---|---|---|---|
| 1,360,131 A | * | 11/1920 | Miller | ....................... E04G 1/22 52/121 |
| 1,511,679 A | * | 10/1924 | Schwarz | ................... B66F 3/22 254/107 |
| 2,697,845 A | * | 12/1954 | Broner | .................. E01D 15/124 14/45 |
| 3,593,481 A | * | 7/1971 | Mikulin | ................ E04H 12/187 14/45 |

(Continued)

FOREIGN PATENT DOCUMENTS

| EP | 1 676 776 A1 | 7/2006 |
|---|---|---|
| EP | 2 143 641 A1 | 1/2010 |

*Primary Examiner* — Joseph W Sanderson
(74) *Attorney, Agent, or Firm* — Baker & Hostetler LLP

(57) ABSTRACT

A deployable mast with spontaneous autonomous deployment comprises at least one elementary structural block with a longitudinal axis of deployment X, the elementary structural block comprising two, respectively lower and upper platforms parallel to a plane YZ orthogonal to axis X, and N stages stacked on one another parallel to axis X, where N is more than 1, and where i is between 1 and N−1. Each stage comprises at least six flexible longitudinal connection arms which are articulated by tape springs, which arms are, in the deployed position, on planes parallel to axis X and are inclined relative to axis X, the N stages being secured to one another in pairs by means of connection platforms parallel to the plane YZ; two adjacent lower and upper stages are offset angularly relative to one another by rotation around the axis of deployment X.

15 Claims, 10 Drawing Sheets

(56) References Cited

U.S. PATENT DOCUMENTS

| | | | | |
|---|---|---|---|---|
| 5,085,018 A | * | 2/1992 | Kitamura | H01Q 1/1235 52/108 |
| 5,184,444 A | * | 2/1993 | Warden | B64G 9/00 52/108 |
| 5,239,793 A | | 8/1993 | Chiappetta et al. | |
| 5,351,062 A | * | 9/1994 | Knapp | H01Q 1/1235 248/436 |
| 6,374,565 B1 | | 4/2002 | Warren | |
| 7,617,639 B1 | * | 11/2009 | Pollard | B64G 1/222 343/915 |
| 8,186,121 B2 | * | 5/2012 | Dupuis | B64G 1/222 52/108 |
| 8,770,521 B2 | * | 7/2014 | Baudasse | B64G 1/222 244/171.6 |
| 2003/0041548 A1 | * | 3/2003 | Merrifield | B64G 1/222 52/646 |
| 2004/0194397 A1 | * | 10/2004 | Brown | B64G 1/222 52/108 |
| 2007/0145195 A1 | * | 6/2007 | Thomson | B64G 1/222 244/172.6 |
| 2008/0283670 A1 | * | 11/2008 | Harvey | B64G 1/222 244/172.6 |
| 2008/0290221 A1 | * | 11/2008 | Dupuis | B64G 1/222 244/172.6 |
| 2010/0319270 A1 | * | 12/2010 | Slade | B64G 1/222 52/71 |
| 2012/0267482 A1 | * | 10/2012 | Baudasse | B64G 1/222 244/171.7 |

* cited by examiner

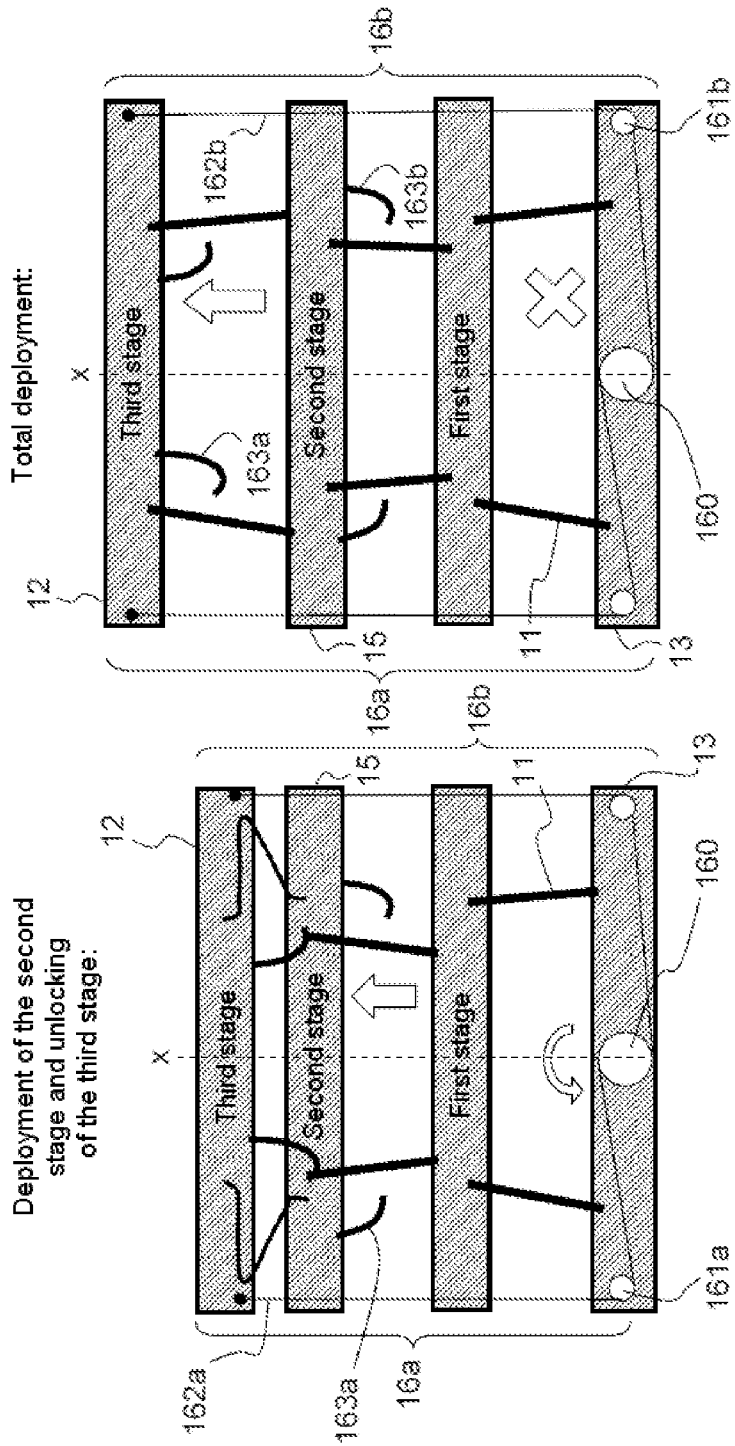

DEPLOYABLE MAST WITH SPONTANEOUS AUTONOMOUS DEPLOYMENT, AND SATELLITE

CROSS-REFERENCE TO RELATED APPLICATION

This application claims priority to foreign French patent application No. FR 1401992, filed on Sep. 5, 2014, the disclosure of which is incorporated by reference in its entirety.

TECHNICAL FIELD

The present invention relates to a deployable mast with spontaneous autonomous deployment, and to a satellite comprising at least one mast of this type. It applies notably to the field of space equipment which must be deployed in orbit, and more particularly to space equipment for satellites, such as sensors or antennae, or long focal distance instruments such as telescopes, for example.

BACKGROUND OF THE INVENTION

A deployable mast which is designed to connect two pieces of space equipment which are several meters apart is generally constituted by a plurality of mast segments which are stacked on one another and articulated to one another, and the deployment of which is motorized. Each mast segment is generally composed of a plurality of rigid beams articulated by hinges and blocked by locks. This type of mast has the disadvantage of needing the use of a motor for the deployment, and has the problem of a substantial weight, and of reliability of the articulations. In addition, since the beams are rigid, in the stored position the mast occupies a substantial space under the nose cone of a launcher. Since the space allocated to the deployable structures under the nose cone of a launcher is limited, it is important to reduce the space taken up by the mast when it is in the stored position, such that its surface area is optimized in the deployed position. Thus, the mast must have a ratio of deployed length to stacked volume which is as high as possible, whilst ensuring a low weight, as well as stability and rigidity of the mast in the deployed position which are great enough to be compatible with the space applications.

SUMMARY OF THE INVENTION

The objective of the invention is to provide a deployable mast which does not have the disadvantages of the existing deployable masts, and has the advantage of taking up little space, being light and simple to produce, and having optimization of the volume of the mast when it is stored under the nose cone of a launcher, whilst permitting reliable deployment in orbit over a long length, and control of the deployment without using a motor, as well as permitting rigidity and stability of the mast when it is deployed.

For this purpose, the invention relates to a deployable mast with spontaneous autonomous deployment comprising at least one elementary structural block with a longitudinal axis of deployment X, the elementary structural block comprising two, respectively lower and upper platforms parallel to a plane YZ orthogonal to the axis X, and N stages stacked on one another parallel to the longitudinal axis of deployment X, where N is more than 1, and where i is between 1 and N−1. Each stage comprises at least six flexible longitudinal connection arms which are articulated by tape springs, which arms are, in the deployed position, on planes parallel to the axis X and are inclined on the axis X; the N stages are secured to one another in pairs by means of connection platforms parallel to the plane YZ, two adjacent lower and upper stages being offset angularly relative to one another by rotation around the axis of deployment X. The mast comprises means for regulation of the speed of deployment of the mast which comprise for example a main, motorized pulley secured on the lower platform, and secondary, non-motorized pulleys, which can be driven by the main pulley by means of at least one cable or one tape.

The secondary pulleys can be secured on the upper platform and on each connection platform by means of a single cable or tape which connects the secondary pulleys of the various platforms to the main pulley.

According to an alternative, the secondary pulleys are secured on the lower platform, the main pulley is stepped, and comprises as many stages as secondary pulleys, and the means for regulation of the speed comprise as many cables or tapes as secondary pulleys, which are secured respectively on the upper platform and on each connection platform.

According to another alternative, the secondary pulleys are secured on the lower platform, the main pulley is stepped, and comprises as many stages as secondary pulleys, and the means for regulation of the speed comprise as many cables or tapes as secondary pulleys, which are secured respectively on the upper platform only.

According to a characteristic of the invention, two, respectively lower and upper adjacent stages are secured to one another by means of a connection platform common to the two adjacent stages.

Preferably, each upper, lower and connection platform comprises securing lugs which are grouped in regularly distributed pairs, each securing lug being dedicated to the securing of an end of a connection arm.

According to another characteristic of the invention, the securing lugs are oriented towards the exterior of the mast, and for each pair of securing lugs the connection arms in a folded configuration are oriented by an angle of between 0° and 45° on the plane YZ, tangentially relative to the platform.

Each connection arm advantageously has folding areas (=areas articulated by means of tape springs), and non-folding areas with a cross-section in the form of an arc of a circle, such that the arc of a circle of the non-folding areas is longer than that of the folding areas.

The folding areas are typically situated towards the two ends of the connection arm and in an intermediate area, and the cross-sections in the form of an arc of a circle of the areas situated towards the ends can be inverted (diametrically opposite) relative to the cross-section of the intermediate area.

At least three pairs of securing lugs are distributed around the lower and upper platforms, and at least six pairs of securing lugs are distributed around each connection platform. When the platforms are triangular, the pairs of securing lugs are generally distributed at the tops of the triangles, but this is not indispensable.

All the connection arms are advantageously identical, and have the same lengths.

The deployable mast can comprise a plurality of identical structural blocks which are stacked on one another.

A device for locking-release of the deployment is advantageously positioned on each connection platform, in order, after the deployment of said platform, to permit the release of the adjacent platform which is higher than it.

The ends of connection arms in the form of tape springs have a profile which varies according to the deployed or folded position of the connection arms; according to a characteristic of the invention, the locking-release device comprises means for locking-release according to said profile.

The invention also relates to a satellite, characterized in that it comprises at least one mast deployable with spontaneous autonomous deployment, as previously described.

BRIEF DESCRIPTION OF THE DRAWINGS

Other characteristics and advantages of the invention will become apparent from reading the following detailed description provided by way of non-limiting example and with reference to the appended drawings in which:

FIGS. 7a-7d represent schematically, seen in cross-section, an example of means for regulation of the speed of deployment of a mast according to the invention with four stages, in the stored configuration (FIG. 7a), during deployment (FIGS. 7b and 7c), and deployed (FIG. 7d), for sequential deployment of the various stages of the mast.

DETAILED DESCRIPTION

From one figure to another, the same elements have the same references.

Hereinafter in the description, the expressions "lower", "upper", "low", "high" are used with reference to the orientation of the figures described. Since the device can be positioned according to other orientations, the directional terminology is indicated by way of illustration, and is non-limiting.

Figure 1:
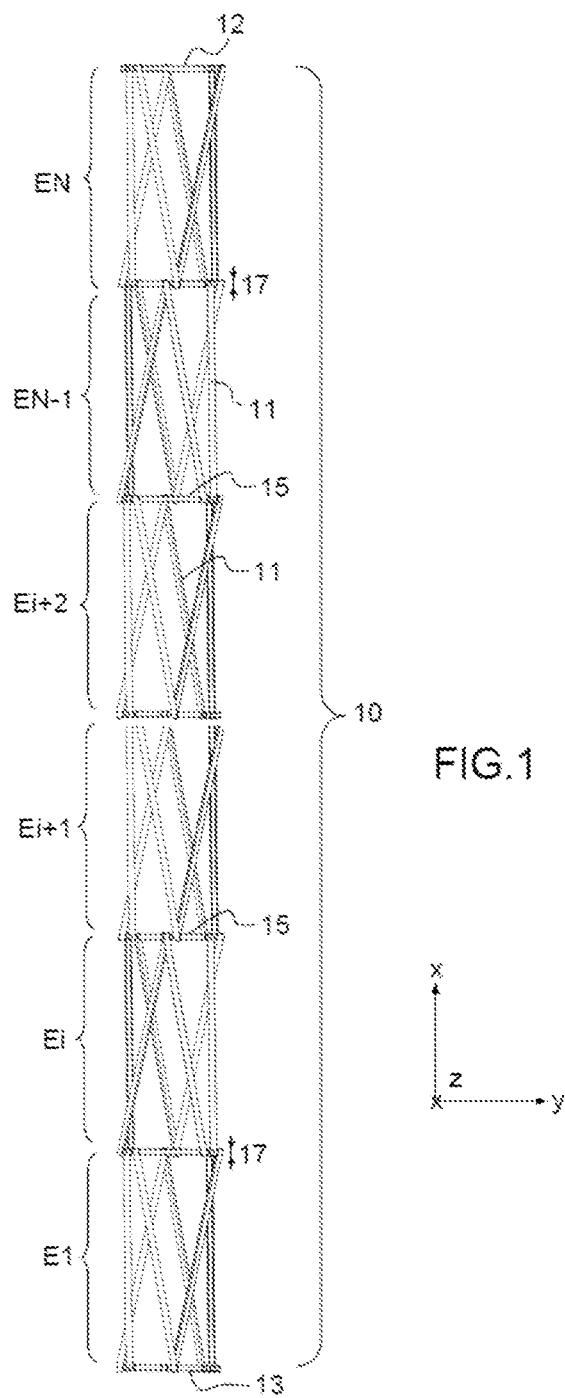
FIG. 1 represents schematically an example of a mast according to the invention with six stages, in the deployed position.

FIG. 1 illustrates an example of a deployable mast according to the invention, in a position deployed according to a longitudinal axis of deployment X, the mast comprising an elementary structural block with a plurality of stages. An elementary structural block 10 is constituted by at least a lower platform 13, an upper platform 12, one or a plurality of connection platforms 15 and N stages E1, . . . , Ei, Ei+1, EN, where N is a whole number of more than one and i is between 1 and N−1 inclusive, stacked on one another parallel to the longitudinal axis of deployment X, and secured rigidly to one another in pairs. Two adjacent stages Ei and Ei+1 can be secured to one another by means of a connection platform 15 which is common to two adjacent stages. The two, lower 13 and upper 12 platforms and the connection platforms 15 are parallel to a plane YZ orthogonal to the axis X; they are rigid, and preferably have a symmetrical form around the axis X, such as, for example, a form in the shape of a disc or a ring, or they can have a polygonal peripheral contour (triangular for example, as shown in the figures), or circular.

A stage of the elementary structural block 10 comprises at least six connection arms equipped with tape springs 11, which, when deployed, extend on planes parallel to the axis X, and the ends of which are secured respectively on an upper platform 12 or a lower platform 13, or a connection platform 15. The tape springs are all identical, and all have the same length and the same form. Each connection arm equipped with a tape spring comprises a lower end which is secured rigidly on a platform of a lower stage Ei, and an upper end which is secured rigidly on a platform of an upper stage Ei+1 which is adjacent to the lower stage Ei. For this purpose, each upper and lower platform and each connection platform comprise securing lugs 14 which are distributed on their periphery, each securing lug being dedicated to securing an end of a connection arm equipped with a tape spring.

It is possible to increase the length of the mast by stacking a plurality of elementary structural blocks on one another.

In patent EP 14160636.8 the applicant described a deployable mast with spontaneous autonomous deployment comprising platforms connected to one another by at least three tape springs. In the deployed position, the tape springs are parallel to the axis X of the mast, and in the stacked position they are folded in two in the direction of the length, radially towards the interior of the mast or towards the exterior. However, this structure causes some problems of stability during the deployment: the tapes can be deployed in a manner which is non-synchronized and non-regulated as a result of the position and orientation of the tapes. When deployed, the orientation of the tapes does not make it possible to provide any resistance to torsion.

Figure 2:
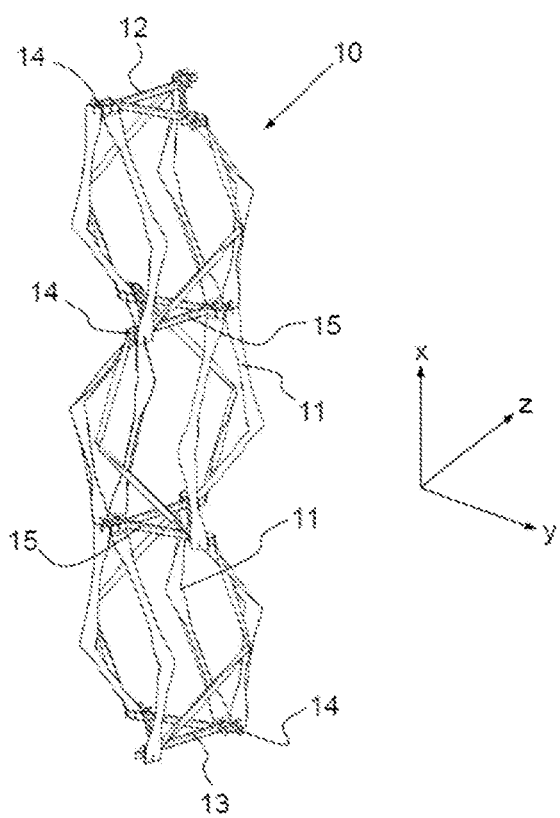
FIG. 2 represents schematically in perspective an example of a mast according to the invention with three stages, during deployment.

According to the invention, in the deployed position the connection arms which are articulated by tape springs are on planes parallel to the direction X of deployment, but, as illustrated in FIG. 2, they are not parallel to the axis X of the mast; when deployed, they are inclined relative to X as can be seen in FIG. 1. This inclination allows the connection arms equipped with tape springs to absorb the loads and moment applied to the platforms in the form of force according to their axis of deployment (i.e. according to their own neutral axis) which is more favourable in terms of absorbing the load. Between two adjacent platforms, and when they are deployed, they form in pairs figures which resemble Vs and/or inverted Vs, with the point of the Vs being able to be more or less pointed according to the spacing of the securing lugs of the ends of the connection arms. The smaller this spacing, the more the passage of force is direct, which makes it possible to balance the thrust between the connection arms equipped with tape springs, and thus increase the rigidity. In the stacked (or stored) configuration shown in FIGS. 3a and 3b, the connection arms equipped with tape springs are not folded radially; they are folded in two according to their length towards the exterior, and each folded tape spring typically forms with one of the two platforms on which it is secured an angle α of between 0° and 45°, which provides better stability of deployment and takes up less space. The angle α is defined by the direction of a connection arm which is folded relative to the tangent to a circle which passes on a plane YZ, via the areas of anchorage of the securing lugs. This angle α is typically determined according to the length of the mast, its volume in the stored configuration, and the rigidity required.

Figure 4A:
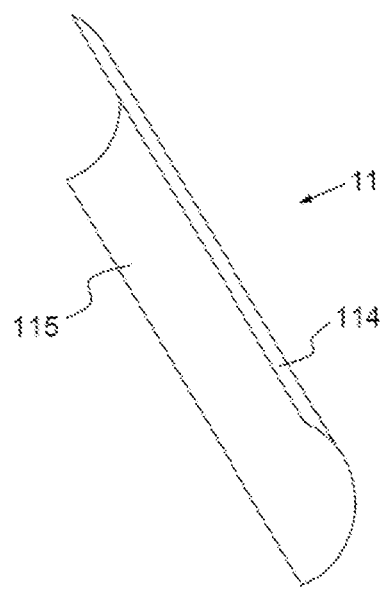
FIGS. 4a-4d represent schematically in perspective examples of connection arms equipped with tape springs according to the invention, with a continuous cross-section (FIGS. 4a and 4b) and with developing cross-sections shown in folded and deployed configurations (FIGS. 4c and 4d)
Figure 4B:
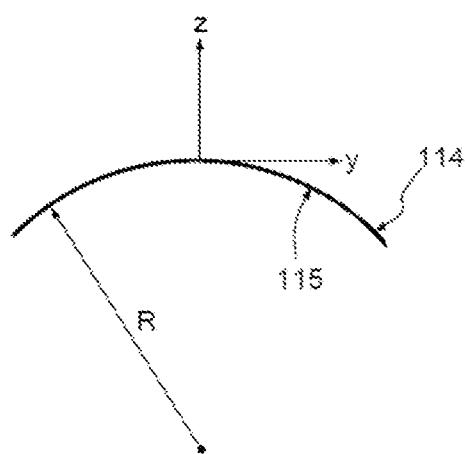

Tape springs are known in the space field as being tapes or flexible blades with a first, convex face 114 and a second, concave face 115, and having a cross-section in the form of an arc of a circle with a radius of curvature R as represented for example in FIGS. 4a and 4b. Tape springs have a natural tendency to be deployed longitudinally autonomously, substantially because of their own resilient energy, without use of a motor.

Figure 4C:
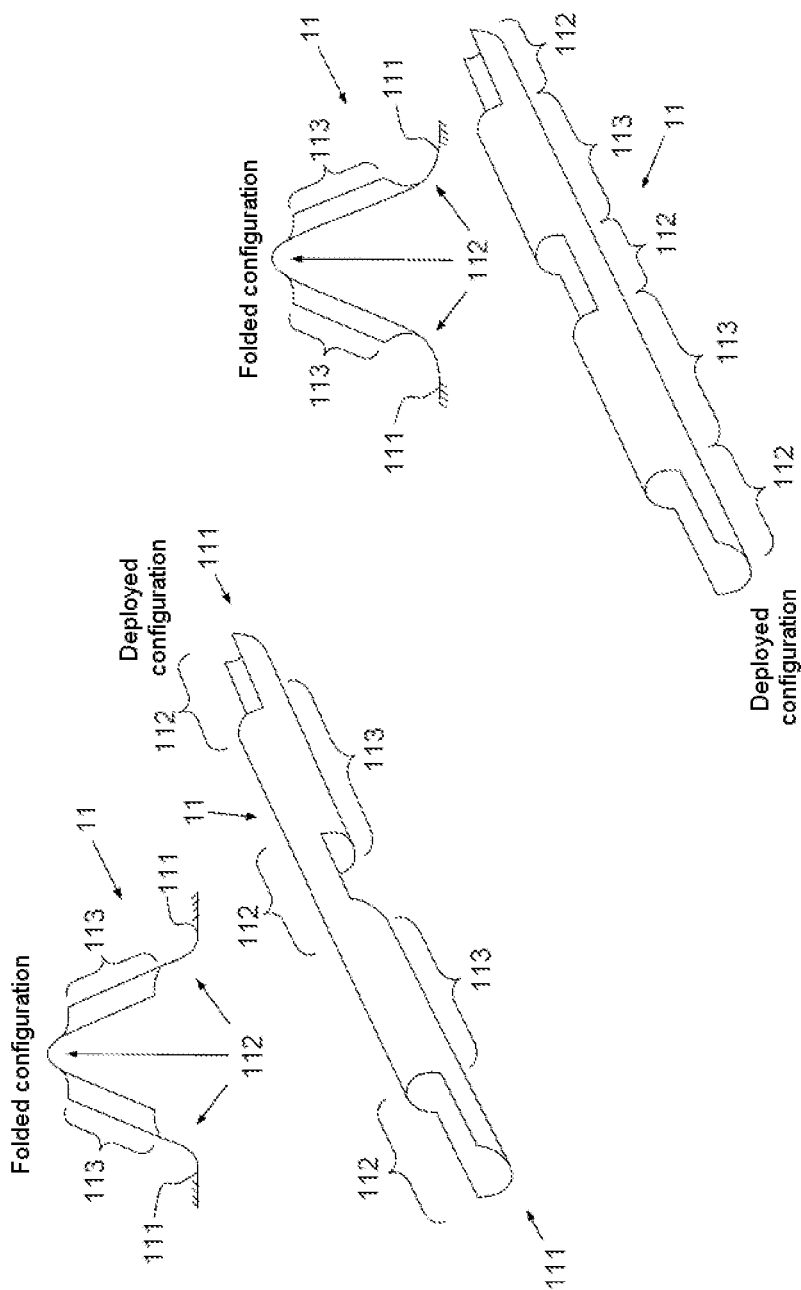
Figure 4D:
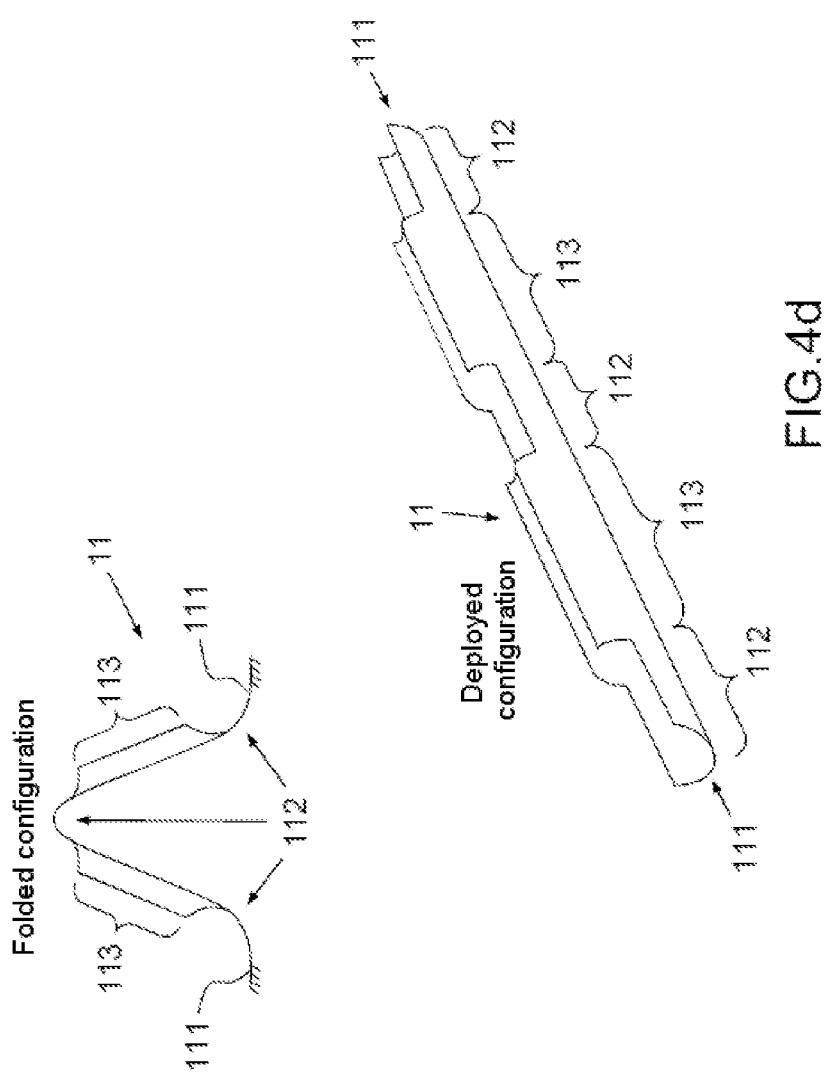

Within the context of the invention, it is possible to use connection arms equipped with commercially available tape springs with a cross-section which is constant along the entire length of the tape spring. As shown in FIGS. 4c and 4d, where in both cases the connection arm is in the folded and deployed configuration, it is also possible to use tape springs which have a developing cross-section along their length, in order to optimize the performance; typically, the need for a cross-section in the form of an arc of a circle is indispensable only at right angles to the folds. Each connection arm has folding areas 112 articulated by tape springs, which are situated towards the two ends 111 and in an intermediate area, as well as non-folding areas 113. According to an embodiment of the invention, the non-folding areas 113 have a cross-section in the form of an arc of a circle which is longer than the arc of a circle of the folding areas 112, as shown in FIG. 4d, and which can be maximum, thus forming a complete circle which then defines tubular areas as shown in FIG. 4c: this assists the resistance to buckling. In addition, the cross-sections in the form of an arc of a circle of the folding areas at the ends 111 can be inverted relative to the cross-section of the intermediate folding area, as shown in FIG. 4c: this therefore provides the same deployment force over all the folded areas. When the cross-sections in the form of an arc of a circle are identical for all the folding areas, this provides different deployment forces according to the folded areas. In the example in FIG. 4d, the connection arm comprises a tape spring along its entire length.

The tape springs can be oriented such as to have their concave face oriented towards the exterior of the mast, but it is also possible to orient them in the opposite direction, such that they have their concave face oriented towards the interior of the mast.

Reference is now made to FIG. 1. Each stage comprises at least six connection arms 11 equipped with tape springs which extend in the deployed position on planes parallel to the longitudinal axis of deployment X, and are inclined relative to the axis X, the six connection arms 11 equipped with tape springs 11 comprising two opposite ends which are secured respectively on connection platforms 15 or on the upper platform 12 or on the lower platform 13. In order to ensure the securing of the ends of the connection arms 11 of the two adjacent stages Ei, Ei+1, the number of securing lugs 14 of each connection platform 15 is twice as many as the number of connection arms 11 of a stage Ei of the elementary structural block 10. Thus, in the case when each stage Ei of the elementary structural block comprises six connection arms 11, each connection platform 15 comprises twelve securing lugs which are grouped in six pairs, preferably distributed regularly around the platform, i.e. three pairs on which six connection arms 11 of the lower stage Ei are secured, respectively, and three pairs on which six connection arms 11 of the adjacent upper stage Ei+1 are secured, respectively. Preferably, these six pairs are themselves grouped into three quadruplets 141 of securing lugs which can be seen in FIG. 3b. A stage comprising eight connection arms will comprise two times four pairs of securing lugs, which are preferably grouped into four quadruplets, etc.

The securing lugs 14 are oriented such that they extend towards the exterior of the elementary structural block 10, and thus towards the exterior of the mast. They are integral with each connection platform, and are typically fitted on the outer periphery of each platform.

These securing lugs can be attached directly to the platform. The securing lugs 14 which are integral with each connection platform 15 can be situated on the plane YZ of the corresponding connection platform 15, or can be inclined relative to the plane YZ of this platform, the inclination being oriented in opposite directions for the connection arms of the upper stage Ei+1 relative to the lower stage Ei. The securing lugs of the connection arms of the lower stage Ei can be inclined towards the top of the mast, whereas the securing lugs of the connection arms of the upper stage Ei+1 can be inclined towards the bottom of the mast, such as to create an area of longitudinal overlapping 17 between two adjacent stages Ei and Ei+1, which has the advantage of increasing the rigidity of the mast, and improving the compactness of the elementary structural block 10 when it is folded in the stored position. Two consecutive connection platforms 15, thus belonging to a single stage Ei, therefore comprise securing lugs which are oriented in opposite directions relative to the plane YZ of the two connection platforms.

Figure 3A:
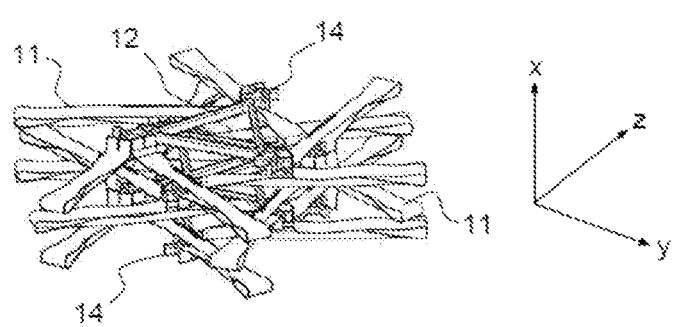
FIGS. 3a and 3b represent schematically an example of a mast according to the invention in the stored position, seen in perspective (FIG. 3a) and seen from above (FIG. 3b)
Figure 3B:
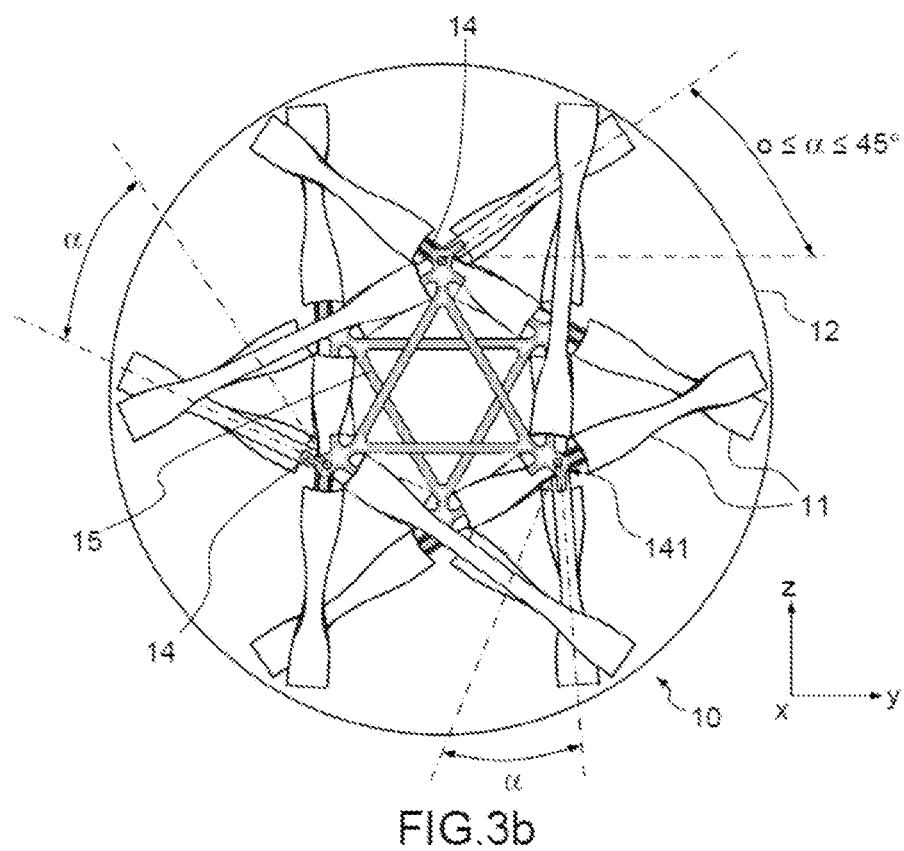

According to an alternative, the securing lugs 14 of a quadruplet are attached to the platform by means of an anchorage area, for example with five branches distributed in the form of a star, one in the extension of the periphery of the platform, and the others dedicated to the four securing lugs, as can be seen in FIG. 3b, with two branches dedicated to securing of the tape springs of the lower stage Ei, and the two other branches dedicated to securing of the tape springs of the upper stage Ei+1.

The ends of the connection arms 11 of each stage Ei can be secured by embedding by means of flanges fitted on the securing lugs 14 of the connection platforms 15 or on the securing lugs 14 of the upper 12 or lower 13 platforms, or they can be secured by riveting, screwing or by gluing. In the case when the mast comprises a plurality of elementary structural blocks 10, the lower 13 and upper 12 platforms which are situated at the base and at the top of each elementary structural block 10 ensure the connection between the connection arms 11 of two consecutive elementary structural blocks.

Preferably, in order for the mast to be balanced, the securing lugs 14 and the connection arms 11 equipped with tape springs 11 which are secured to them are regularly spaced around the longitudinal axis of deployment X, and, for each connection platform, the angles which separate two quadruplets of securing lugs can have identical values.

Two adjacent stages are offset angularly relative to one another by rotation around the axis of deployment X, such as to interpose the connection arms equipped with tape springs of a lower stage Ei between the connection arms equipped with tape springs of an adjacent upper stage Ei+1, and to interpose the securing lugs of a lower stage Ei between the securing lugs of an adjacent upper stage Ei+1, and such that, between two consecutive platforms, the connection arms equipped with tape springs form figures with shapes in the form of Vs and/or inverted Vs.

When an elementary structural block 10 is folded in the stored position, it is in a compact state, and all the upper 12, lower 13 and connection 15 platforms which separate the different stages of the elementary structural block are stacked on one another as represented in the views in FIGS. 3a and 3b, which show the connection arms equipped with tape springs folded towards the exterior of the mast. In FIG. 1, the elementary structural block 10 comprises six stages with six connection arms equipped with tape springs for each stage, i.e. a total of 36 connection arms regularly distributed around the circumference of an annular ring constituted by a stack of all the upper, lower and connection platforms of the elementary structural block in the stacked state. In the compact state, the connection arms 11 are folded into two on themselves in the direction of their length, the folding being carried out towards the exterior of the mast with securing lugs which extend towards the exterior of the mast as represented in FIGS. 3a and 3b. Two consecutive connection platforms 15, which thus belong to a single stage Ei, comprise anchorage areas, the spacing of which is determined such as to ensure maximum resilient folding of the connection arms equipped with tape springs. This spacing is identical for each pair of anchorage areas.

The connection arms 11 equipped with tape springs are made of a material which is compatible with a space environment, and can be made of a metal material or of a composite material such as, for example, carbon fibres embedded in an epoxy resin, or of a cyanate resin. Composite materials are preferable, since they have a far lower coefficient of expansion in relation to temperature than the metal materials. The upper and lower platforms and the connection platforms are preferably made of carbon.

The mast does not comprise any articulation as such, or any hinge, pivot, or deployment motor. In the stored position, all the connection arms 11 equipped with tape springs 11 of all the elementary structural stages Ei store resilient energy, because of the stresses which keep them in the position in which they are folded into two. The connection arms 11 equipped with tape springs are retained in the folded position by a stacking system which retains the various platforms in the stored configuration. The deployment of the mast is initiated by releasing the stacking system. The deployment then takes place passively, by relaxing the stresses on the tape springs when they are unfolded, and releasing the resilient energy stored by the tape springs. In order for the deployment not to be too sudden, speed regulation means are preferably used which make it possible to control the deployment of the mast. For example, the speed of unfolding of the tape springs can be controlled by progressive unwinding of a cable controlled by a motor.

Figure 5A:
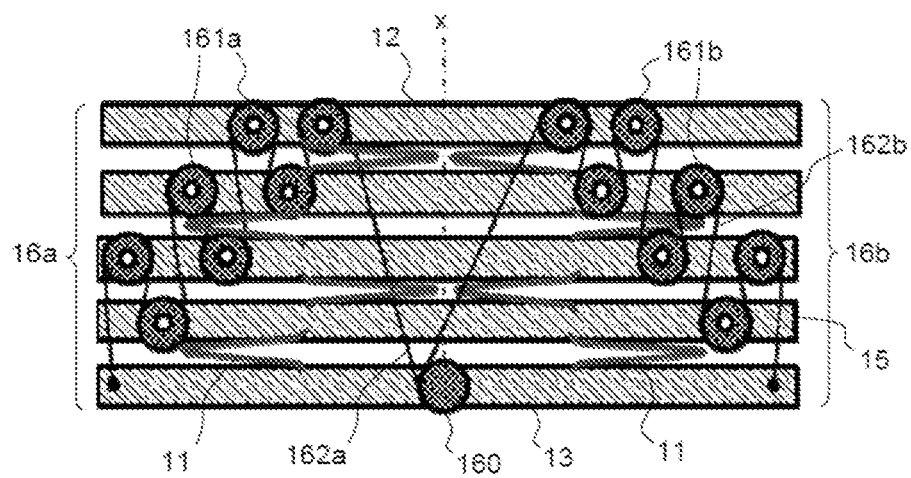
FIGS. 5a and 5b represent schematically, seen in cross-section, a first example of means for regulation of the speed of deployment of a mast according to the invention with four stages, in the stored configuration (FIG. 5a) and during deployment (FIG. 5b), for synchronized deployment of the various stages of the mast.
Figure 5B:
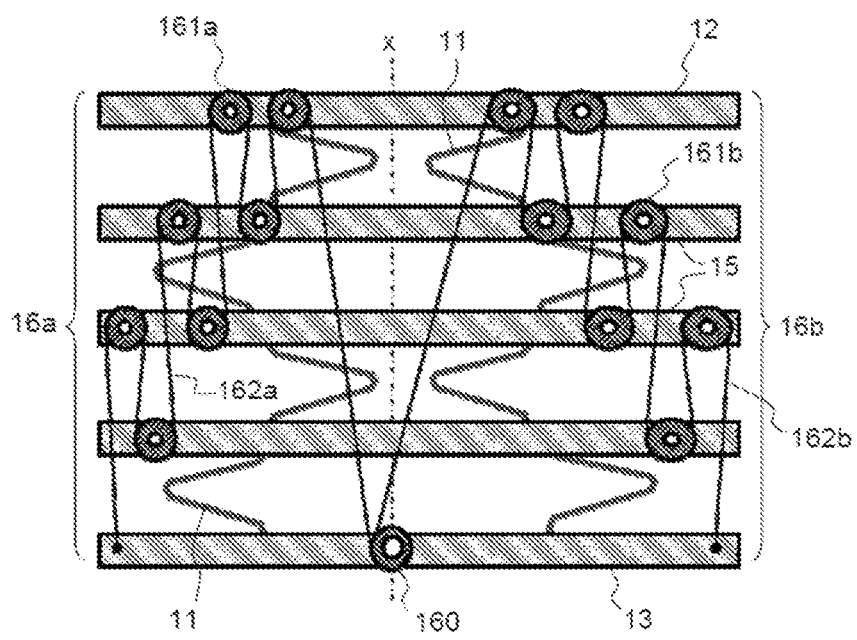

These means for regulation of the speed of deployment are advantageously distributed in at least three identical speed regulation devices; in the present example they comprise three, distributed around the periphery of the platforms. The speed regulation means are described in relation to FIGS. 5, 6 and 7, which show in cross-section two speed regulation devices 16a and 16b. Each speed regulation device 16a or 16b typically comprises:

a single main, motorized pulley 160 which is secured on the lower platform, and is common to all the braking devices 16a, 16b; and, secondary, non-motorized pulleys 161a, 161b which can be driven by the main pulley 160 by means of at least one connection cable 162a, 162b. The cable can be replaced by a tape, i.e. a strip with a flat cross-section. It is also possible to wind a plurality of cables or strips simultaneously on the same pulley stage, as represented in FIGS. 5a and 5b. The main pulley can comprise a plurality of grooves in order to drive a plurality of cables.

A distinction is made between speed regulation means with synchronized deployment, with all the stages being deployed in a synchronized manner, and speed regulation means with sequential deployment, with the first stage then being deployed before the second, which is deployed before the third, etc.

According to a first embodiment, an example of which is shown in FIGS. 5a and 5b, for a speed regulation device with synchronized deployment means 16a or 16b, which comprises one or two secondary pulleys 161a, 161b secured on the upper platform 12 and on each connection platform 15, a single cable or tape 162a, 162b connects the secondary pulleys of different platforms to the main pulley 160.

Figure 6:
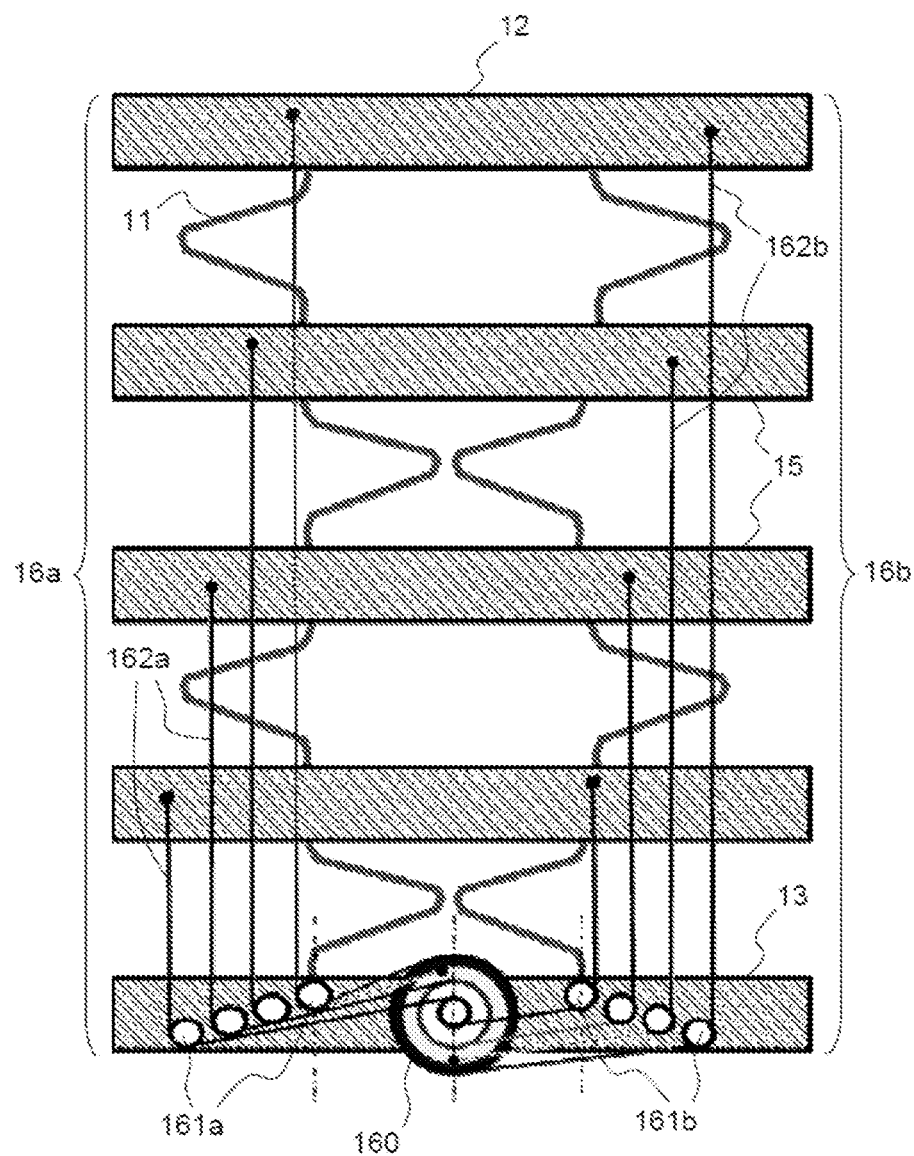
FIG. 6 represents schematically, seen in cross-section, a second example of means for regulation of the speed of deployment of a mast according to the invention with four stages, during deployment, for synchronized deployment of the various stages of the mast.

According to another configuration described in relation to FIG. 6, a speed regulation device 16a or 16b with synchronized deployment means comprises:

secondary pulleys 161a, 161b which are secured on the lower platform 13, and are dedicated respectively to the upper platform 12 and to each connection platform 15;

connection cables 162a, 162b or tapes which connect respectively the main pulley 160 to said upper platform or connection platform, via the corresponding secondary pulley. This main pulley is stepped, and the diameters of the different pulley stages are calculated to permit homogenous deployment of the different stages. In the case of the configuration with four stages, with the upper platform having to travel a distance four times greater than that of the first stage, the diameters of the main stepped pulley 160 must therefore comprise the corresponding spacing.

According to another embodiment, an example of which is shown in FIGS. 7a to 7d, a speed regulation device 16a, 16b with sequential deployment means comprises:

a single secondary pulley 161a, 161b secured on the lower platform 13;

a single cable or tape 162a, 162b which connects the main pulley 160 to the upper platform 12 via this secondary pulley; and a device for locking/release of the connection platform 15 and upper platform 12.

Figures 7A, 7B:
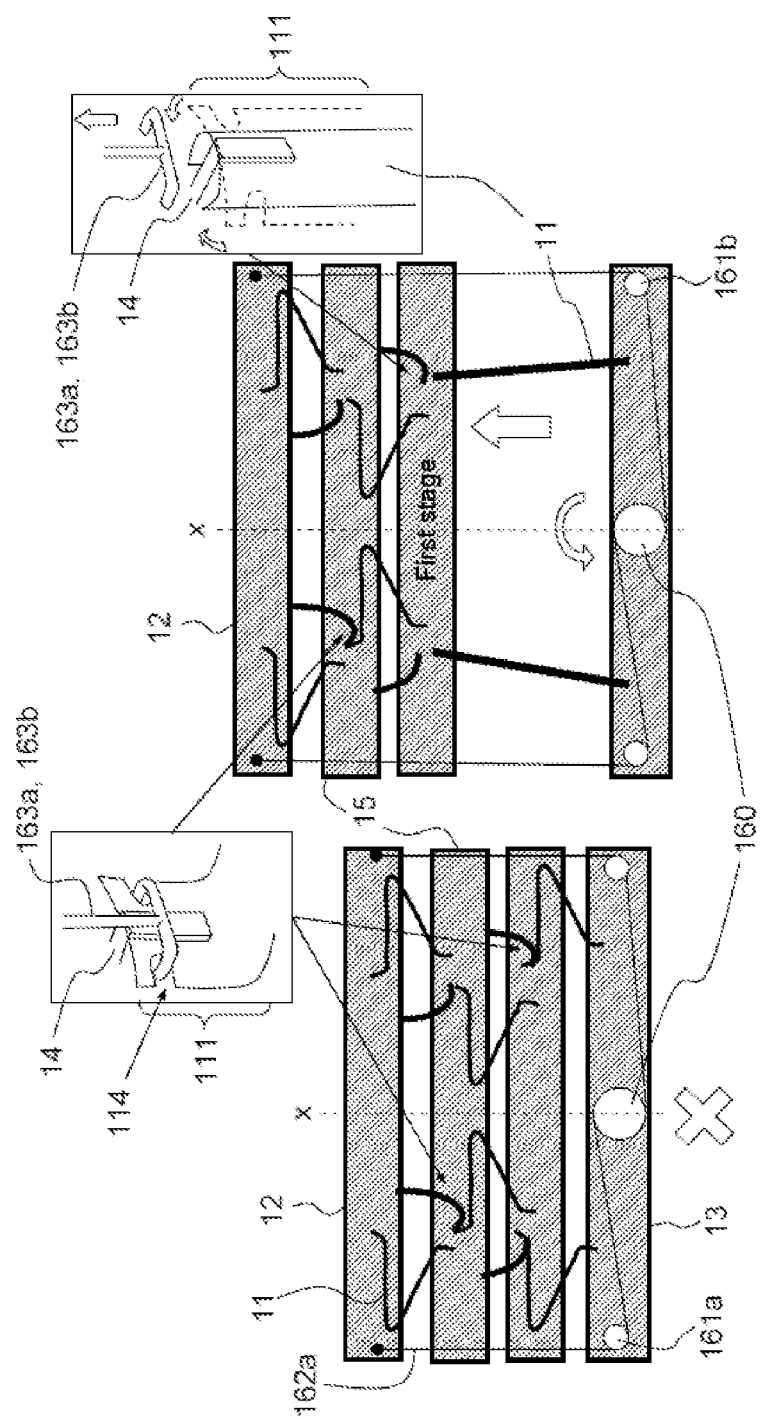

This locking/release device shown in FIGS. 7a and 7b in zoom form comprises for each stage Ei a hook 163a, 163b which is connected to the upper platform 12 or to the upper connection platform 15 of this stage Ei (except optionally in the case of the upper connection platform of the stage E1, the deployment of this first stage being controlled by the release of the stacking system which keeps the structure in the stored configuration during the launching phase, the structure then being retained and having its speed regulated by the main pulley, according to whether it is at a standstill as symbolized by an X in FIGS. 7a and 7d, or in motion as symbolized by a rounded arrow in FIGS. 7b and 7c). The other end of the hook is designed to be hooked during the locking on the lower connection platform of this stage Ei in the following manner. This other end has a shape in the form of a "U" on the plane YZ of this lower platform, the branches of the "U" being engaged in notches provided for this purpose in the upper end 111 of the connection arm 11 (this end is in the form of a tape spring), which itself is secured on this lower platform. When this lower platform is in the stored position, this end 111 is flattened, and the branches of the "U" are engaged in the tape spring, thus blocking its deployment: the lower platform is then hooked on its upper platform by the hook. The deployment of the connection arm equipped with tape springs gives rise to the deformation of these ends, which regain their curved form (position of rest). When this end 111 curves towards the interior of the "U" thanks to its resilient energy, the branches of the "U" are released from the notches: the hook no longer blocks the deployment of the tape spring. The hooks are thus released step by step sequentially, as are therefore the corresponding connection platforms 15 and the upper platform 12. This locking/release device can also be installed on the mast independently of the other elements (pulleys, cables, etc.) of the means for regulation of the speed.

For space applications, the mast can be used for example in order to move a device or an antenna away from the body of a satellite. In this case, the lower platform 13 of the lower stage of the mast is secured on the body of the satellite, and the device to be moved away is secured on the upper platform 12 of the upper stage of the mast.

Although the invention has been described in association with particular embodiments, it will be appreciated that it is in no way limited to this, and that it comprises all the technical equivalents of the means described, as well as their combinations, if these come within the scope of the invention.

The invention claimed is:

1. A deployable mast with spontaneous autonomous deployment comprising:
   at least one elementary structural block with a longitudinal axis of deployment X, the elementary structural block comprising two, respectively lower and upper platforms parallel to a plane YZ orthogonal to the axis X, and stages $E_i$ ($E_1, \ldots, E_i, E_{i+1}, \ldots, E_N$) stacked on one another parallel to the longitudinal axis of deployment X, where i is between 1 and N, and where N is more than 1;
   wherein each stage ($E_i$) comprises at least six flexible longitudinal connection arms comprising tape springs, the connection arms being articulated by tape springs, which arms are, in the deployed position, on planes parallel to the axis X and are inclined relative to the axis X, the stages being secured to one another in pairs by means of connection platforms parallel to the plane YZ, in that two adjacent lower and upper stages ($E_i$, $E_{i+1}$) are offset angularly relative to one another by rotation around the axis of deployment X, and
   further comprising means for regulation of the speed of deployment of the mast which comprise a main, motorized pulley secured on the lower platform, and secondary, non-motorized pulleys, which can be driven by the main pulley by means of at least one cable or one tape extending along the longitudinal axis of deployment X between the platforms and the secondary pulleys.

2. The deployable mast according to claim 1, wherein at least one of the secondary pulleys is secured on the upper platform and on each connection platform, and in that a single cable or tape connects the secondary pulleys of the various platforms to the main pulley.

3. The deployable mast according to claim 1, wherein the secondary pulleys are secured on the lower platform, the main pulley comprises as many stages as secondary pulleys, and the means for regulation of the speed comprise as many said at least one cable or tape as secondary pulleys, which are secured respectively on the upper platform and on each connection platform.

4. The deployable mast according to claim 1, wherein the secondary pulleys are secured on the lower platform, the main pulley comprises as many stages as secondary pulleys, and the means for regulation of the speed comprise as many said at least one cable or tape as stages of the main pulley and at least one of a mobile platform and the upper platform, the cables or tapes being secured on the upper platform.

5. The deployable mast according to claim 1, wherein each upper, lower and connection platform comprises securing lugs which are grouped in regularly distributed pairs, each securing lug being dedicated to the securing of an end of one of the at least six flexible longitudinal connection arms.

6. The deployable mast according to claim 5, wherein the securing lugs are oriented towards the exterior of the mast, and for each pair of securing lugs the connection arms in a folded configuration are oriented by an angle of between 0° and 45° on the plane YZ, tangentially relative to the platform.

7. The deployable mast according to claim 1, wherein each tape spring has folding areas with a cross-section in the form of an arc of a circle, and non-folding areas with a cross-section in the form of an arc of a circle, and the arc of the circle of the non-folding areas is longer than that of the folding areas.

8. The deployable mast according to claim 7, wherein the folding areas are situated at the two ends of the connection arm and in an intermediate area, and the cross-sections in the form of an arc of a circle of the areas at the ends are diametrically opposite relative to the cross-section of the intermediate area.

9. The deployable mast according to claim 7, wherein the folding areas with the cross-section in the form of an arc of the circle are situated at the two ends and in an intermediate area, and the cross-sections of the non-folding areas have a tubular cross-section.

10. The deployable mast according to claim 1, wherein each connection platform comprises at least six pairs of securing lugs.

11. The deployable mast according to claim 1, wherein all the connection arms are identical.

12. The deployable mast according to claim 1, comprising a plurality of the at least one identical structural block stacked on one another.

13. The deployable mast according to claim 1, wherein a device for locking-release of the deployment is positioned on each connection platform, in order, after the deployment of said platform, to permit the release of the higher adjacent platform.

14. The deployable mast according to claim 13, wherein the two ends of connection arms are in the form of tape springs and have a profile which varies according to the deployed or folded position of the connection arms, and in that the locking-release device comprises means for locking-release according to said profile.

15. A satellite comprising at least one mast deployable with spontaneous autonomous deployment, according to claim 1.

* * * * *